(12) United States Patent
Okazaki

(10) Patent No.: US 9,370,050 B2
(45) Date of Patent: Jun. 14, 2016

(54) ELECTRIC POWER GENERATION SYSTEM

(75) Inventor: Toru Okazaki, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 13/500,098

(22) PCT Filed: Sep. 13, 2010

(86) PCT No.: PCT/JP2010/065745
§ 371 (c)(1),
(2), (4) Date: Apr. 4, 2012

(87) PCT Pub. No.: WO2011/045999
PCT Pub. Date: Apr. 21, 2011

(65) Prior Publication Data
US 2012/0193924 A1 Aug. 2, 2012

(30) Foreign Application Priority Data
Oct. 15, 2009 (JP) ................. 2009-238618

(51) Int. Cl.
*F03D 9/00* (2006.01)
*H02P 9/04* (2006.01)
(Continued)

(52) U.S. Cl.
CPC ............. *H05B 6/109* (2013.01); *F03D 9/006* (2013.01); *F03D 9/02* (2013.01); *H05B 6/108* (2013.01); *F05B 2220/602* (2013.01); *F05B 2220/702* (2013.01); *Y02B 10/30* (2013.01); *Y02B 10/70* (2013.01); *Y02E 10/721* (2013.01);
(Continued)

(58) Field of Classification Search
CPC ........... F01K 25/08; F01K 27/02; F01K 7/22; F03D 9/00; Y02E 10/725
USPC .................................. 290/44, 54, 55
See application file for complete search history.

(56) References Cited

U.S. PATENT DOCUMENTS 5,384,489 A * 1/1995 Bellac ............................ 290/44
5,537,813 A * 7/1996 Davis et al. ..................... 60/775
(Continued)

FOREIGN PATENT DOCUMENTS

AU 694985 B2 8/1998
CN 1737461 A 2/2006
(Continued)

OTHER PUBLICATIONS

"11.1 Superconducting coil," ACFA, website captured by Internet Archive on Oct. 24, 2004.*
(Continued)

*Primary Examiner* — Tulsidas C Patel
*Assistant Examiner* — Thomas Quigley
(74) *Attorney, Agent, or Firm* — Drinker Biddle & Reath LLP

(57) ABSTRACT

An electric power generation system includes a wind turbine, a conductor rotating as the wind turbine rotates, a heat transfer medium vessel, a magnetic field generator, a heat accumulator, and an electric power generation unit. The magnetic field generator is operated to generate a magnetic field and therein the conductor is rotated and thus heated through induction, and the conductor's heat is transmitted to the water in the heat transfer medium vessel to generate steam which is in turn supplied to a steam turbine and thus drives an electric power generator to generate electric power.

11 Claims, 2 Drawing Sheets

(51) Int. Cl.
*H05B 6/10* (2006.01)
*F03D 9/02* (2006.01)

(52) U.S. Cl.
CPC ............. *Y02E 10/725* (2013.01); *Y02E 10/726* (2013.01); *Y02P 70/523* (2015.11)

(56) References Cited

U.S. PATENT DOCUMENTS

| | | | | |
|---|---|---|---|---|
| 5,832,728 | A | * | 11/1998 | Buck ............................. 60/407 |
| 2006/0037348 | A1 | | 2/2006 | Kang et al. |
| 2008/0022683 | A1 | | 1/2008 | Ohler et al. |
| 2008/0276616 | A1 | * | 11/2008 | Flynn et al. ............... 60/641.15 |
| 2012/0001436 | A1 | * | 1/2012 | Sami et al. ..................... 290/55 |

FOREIGN PATENT DOCUMENTS

| | | |
|---|---|---|
| DE | 44 29 386 A1 | 2/1996 |
| DE | 100 04 342 | 8/2001 |
| EP | 1 577 548 A1 | 9/2005 |
| GB | 2 326 527 A | 12/1998 |
| JP | 52-140036 | 11/1977 |
| JP | S54-8240 A | 1/1979 |
| JP | 54-79332 | 6/1979 |
| JP | 56-014872 | 2/1981 |
| JP | 57-131875 A | 8/1982 |
| JP | 57-140573 | 8/1982 |
| JP | 4-10379 | 1/1992 |
| JP | 2000-280728 | 10/2000 |
| JP | 2006-63854 | 3/2006 |
| JP | 2007-529665 | 10/2007 |
| JP | 2011-089492 | 5/2011 |
| KR | 2000-0033579 A | 6/2000 |
| SU | 1710824 A1 | 2/1992 |
| TW | 460635 | 10/2001 |
| WO | WO 91/19138 A1 | 12/1991 |
| WO | WO 2006/007733 A1 | 1/2006 |

OTHER PUBLICATIONS

Machine translation of relevent portion of JP 2006-063854, published Mar. 2006.*
"Wind Power Generation (01-05-01-05)", [online], Atomic Energy Encyclopedia ATOMICA, the Internet <URL:http://www.rist.or.jp/atomica/>, including partial English translation.
"2000-kW Large-Sized Wind Power Generation System SUBARU80/2.0 PROTOTYPE", [online], Fuji Heavy Industries, Ltd., the Internet <URL:http://www.subaru-windturbine.jp/home/index.html>, including partial English translation.
"Wind Power Lecture", [online], Mitsubishi Heavy Industries, Ltd., the Internet <URL:http://www.mhi.co.jp/products/expand/wind_kouza_0101.html>, including partial English translation.
"Solar Thermal Power Generation System (01-05-01-02)" [online], Atomic Energy Encyclopedia Atomica, the Internet <URL:http://www.rist.or.jp/atomica/>, including partial English translation.
Masur, Larry, "Doubling the Efficiency with Superconductivity", [online], Industrial Heating, the International Journal of Thermal Technology, the Internet <URL:http://www.industrialheating.com/Articles/Feature_Article/BNP_GUID_9-5-2006_A_10000000000000416320>.
Full English-language Translation of Awano (JP 5479332), Publication Date: Jun. 25, 1979.
Hsu, Dr. Tai-Ran, Chapter 6 "Scaling Laws in Miniaturization" Lectures on MEMS and Microsystems Design and Manufacture, http://www.engr.sjsu.edu/trhsu/ME189_Chapter%206.pdf.
Mathur, A, et al., "Using Encapsulated Phase Change Salts for Concentrated Solar Power Plant,"For SolarPACES 2013, pp. 1-9.
Angelini, G., et al., "Comparison of Thermocline Molten Salt Storage Performances to Commercial Two-Tank Configuration," Department of Energy, Politecnico di Milano, SciVerse ScienceDirect: www.sciencedirect.com, SolarPACES 2013.
"Assessment of Parabolic Trough and Power Tower Solar Technology Cost and Performance Forecasts," Subcontractor Report, Sarget & Lundy LLC Consulting Group, Oct. 2003 (NREL/SR-550-34440) 344 pages.
Office Action issued Jan. 18, 2016 in Korean Patent Application No. 10-2012-7012411 (4 pages) with an English Translation (3 pages).

* cited by examiner (A)

(B)

ELECTRIC POWER GENERATION SYSTEM

TECHNICAL FIELD

The present invention relates to an electric power generation system which utilizes wind power to rotate a conductor and applies a magnetic field to the rotating conductor to heat the conductor through induction to heat a heat transfer medium and converts the heat transfer medium's heat into electrical energy to generate electric power.

BACKGROUND ART

In recent years, electric power generation systems utilizing recyclable energy, such as wind power and solar light, attract attention in view of greenhouse effect gas reduction.

For example, Non-Patent Literature 1-3 describe technology relating to wind power generation. Wind power generation rotates a wind turbine by wind to drive an electric power generator to generate electric power. In other words, it converts wind energy into rotational energy and extracts it as electrical energy. A wind power generation system is generally structured such that a tower has an upper portion provided with a nacelle having a horizontal axis wind turbine (a wind turbine having a rotary shaft generally parallel to the wind's direction) attached thereto. The nacelle has accommodated therein a speed up gear which accelerates and thus outputs the rotational speed of the shaft of the wind turbine, and an electric power generator driven by the output of the speed up gear. The speed up gear raises the rotational speed of the wind turbine to the rotational speed of the electric power generator (for example 1:100), and has a gear box incorporated therein.

In these days, for reduced electric power generation costs, there is a tendency to increase a wind turbine (or a wind power generation system) in size, and a wind power generation system of 5 MW with a wind turbine having a diameter of 120 m or larger is put in practical use. Such a large-sized wind power generation system is huge and a heavy load, and accordingly, it is built on the sea for reasons of construction in many cases.

Furthermore, wind power generation provides a varying power generation output (or generates electric power in a varying amount) as wind power varies, and accordingly, an electric power storage system is also provided for a wind power generation system to store unstable electric power in a storage battery to smooth an output.

On the other hand, for example Non-Patent Literature 4 describes technology relating to solar thermal power generation. Solar thermal power generation collects solar heat and changes it into thermal energy and uses the thermal energy to generate steam to rotate a turbine to drive an electric power generator to generate electric power. In other words, it converts solar energy into thermal energy, and extracts it as electrical energy. A solar thermal power generation system that is put in practical use is of a tower system, for example. This is a system which collects solar light to a solar collector provided at an upper portion of a tower and utilizes its heat to generate steam which is in turn delivered to a turbine provided at a lower portion of the tower to rotate the turbine to drive an electric power generator to generate electric power (see Non-Patent Literature 4, FIG. 3).

Solar thermal power generation also provides an output varying with weather, time and the like, and accordingly, for stable electric power generation, a thermal storage system capable of storing heat in a heat accumulator and extracting heat required for generating electric power is provided for a solar thermal power generation system.

CITATION LIST

Non-Patent Literature

NPL 1: "Wind Power Generation (01-05-01-05)" [online] atomic energy encyclopedia ATOMICA, [searched on Oct. 13, 2009], the Internet <URL:http://www.rist.or.jp/atomica/>

NPL 2: "2000-kW Large-Sized Wind Power Generation System SUBARU80/2.0 PROTOTYPE", [online], Fuji Heavy Industries, Ltd., [searched on Oct. 13, 2009], the Internet <URL:http://wwvv.subaru-windturbine.jp/home/index.html>

NPL 3: "Wind Power Lecture", [online], Mitsubishi Heavy Industries, Ltd., [searched on Oct. 13, 2009], the Internet <URL:http://vvww.mhi.co.jp/products/expand/wind_kouza_0101.html>

NPL 4: "Solar Thermal Power Generation System (01-05-01-02)" [online] Atomic Energy Encyclopedia ATOMICA, [searched on Oct. 13, 2009], the Internet <URL:http://www.rist.or.jp/atomica/>

NPL 5: "Doubling the Efficiency with Superconductivity", [online], Industrial heating [searched on Oct. 13, 2009], the Internet <URL: http://www.industrialheating.com/Articles/Feature_Article/BNP_GUID_9-5-2006_A_10000000000000416320>

SUMMARY OF INVENTION

Technical Problem

A wind power generation system is provided with an electric power storage system, and the electric power storage system requires components such as a converter and the like to store electric power to a storage battery and thus invites a complicated system and increased electric power loss. Furthermore, a large-sized wind power generation system requires a storage battery of a large capacity corresponding to an amount of electric power generated, and thus invites an increased cost as a whole system.

On the other hand, a solar thermal power generation system is provided with a thermal storage system, which is simpler than an electric power storage system, and a heat accumulator is also less expensive than a storage battery. However, while wind power generation can also generate electric power at night if only there is wind, solar thermal power generation cannot generate electric power at night. Accordingly, the latter requires a large-scale heat accumulator in order to also continue to supply electric power at night.

Furthermore, when a wind power generation system has troubles, they are often attributed to troubles of a speed up gear, more specifically, of a gear box. If the gear box has a defect, the defect can normally be resolved by replacing the gear box with another one. If the nacelle is provided at an upper portion of the tower, however, attaching and removing the gear box requires a large amount of time and effort. Accordingly, these days, there is also a gearless variable speed type which does not require a speed up gear.

However, the gearless type power generation system specifically involves an electric power generator with an increased number of poles (or a multipolar electric power generator) and when it is compared with a power generation system using a speed up gear, the former involves an electric power generator increased in size and weight. In particular, it is believed that a large-sized wind power generation system of the 5 MW class has an electric power generator having a weight exceeding 300 tons (300,000 kg), and it is difficult to dispose it in the nacelle.

The present invention has been made in view of the above circumstances, and one object thereof is to provide an electric power generation system utilizing wind power, being excellent in maintainability, and capable of reducing in size and weight a nacelle provided at an upper portion of a tower.

Solution to Problem

The present electric power generation system includes: a wind turbine; a conductor rotating as the wind turbine rotates; a magnetic field generator generating a magnetic field traversing the conductor; a heat transfer medium receiving heat from the conductor rotated in the magnetic field and thus heated through induction; and an electric power generation unit converting heat of the heat transfer medium into electrical energy.

The present electric power generation system converts wind energy to rotational energy and then to thermal energy and extracts it as electrical energy, and is thus an unconventional, novel electric power generation system. The present electric power generation system has the following effects: (1) it utilizes wind power, and accordingly, it can generate electric power at night, and if it is provided with a heat accumulator, it can have the heat accumulator smaller in size than a solar thermal power generation system can; (2) it exploits the wind turbine's rotational energy to generate heat and uses the heat to generate electric power. This eliminates the necessity of providing an electric power storage system; and (3) it can dispense with a speed up gear, and thus be free of troubles caused by a gear box.

By the way, rotational energy may be exploited to generate frictional heat. In that case, however, a component that generates frictional heat is worn as it is used, and accordingly, the component needs to be replaced periodically or the like, which is a disadvantage in terms of maintenance. In contrast, the present invention uses rotational energy to rotate a conductor and generates heat by induction heating, and is thus more advantageous than friction heating in terms of maintenance.

The present electric power generation system in one embodiment includes: a tower extending higher than the position of the electric power generation unit; and a nacelle provided at an upper portion of the tower and provided with the wind turbine, the conductor and the magnetic field generator. Furthermore, the present electric power generation system in one embodiment includes: a heat transfer medium vessel disposed in the nacelle and having accommodated therein the heat transfer medium receiving heat from the conductor; and a transport pipe delivering heat of the heat transfer medium in the heat transfer medium vessel to the electric power generation unit.

The wind turbine attached to the nacelle provided at the upper portion of the tower allows the energy of wind with fast wind speed high up in the sky to be utilized. Furthermore, the transport pipe that supplies the heat transfer medium to the electric power generation unit provided at the lower portion (or base) of the tower for example can eliminate the necessity of providing the nacelle with the electric power generation unit and allows a miniaturized and lightweight nacelle to be provided at the upper portion of the tower.

Furthermore, the present electric power generation system in specific forms can include the following:

a form in which an electric power generation unit has a turbine rotated by a heat transfer medium's heat and an electric power generator driven by the turbine;

a form equipped with a heat accumulator storing a heat transfer medium's heat;

a form with a conductor having a portion provided with a magnetic substance;

a form with a magnetic field generator having a coil generating a magnetic field, a form having this coil in the form of a superconducting coil, in particular; and a form with a magnetic field generator generating a revolving magnetic field revolving in a direction opposite to that in which a conductor rotates.

Advantageous Effects of Invention

The present electric power generation system has the following effects: (1) it utilizes wind power, and accordingly, it can generate electric power at night, and if it is provided with a heat accumulator, it can have the heat accumulator smaller in size than a solar thermal power generation system can; (2) it exploits the wind turbine's rotational energy to generate heat and uses the heat to generate electric power. This eliminates the necessity of providing an electric power storage system; and (3) it can dispense with a speed up gear, and thus be free of troubles caused by a gear box.

DESCRIPTION OF EMBODIMENTS

The present invention in embodiment will now be described hereinafter with reference to the drawings. Note that in the figures, identical components are identically denoted.

First Embodiment

Figure 1:
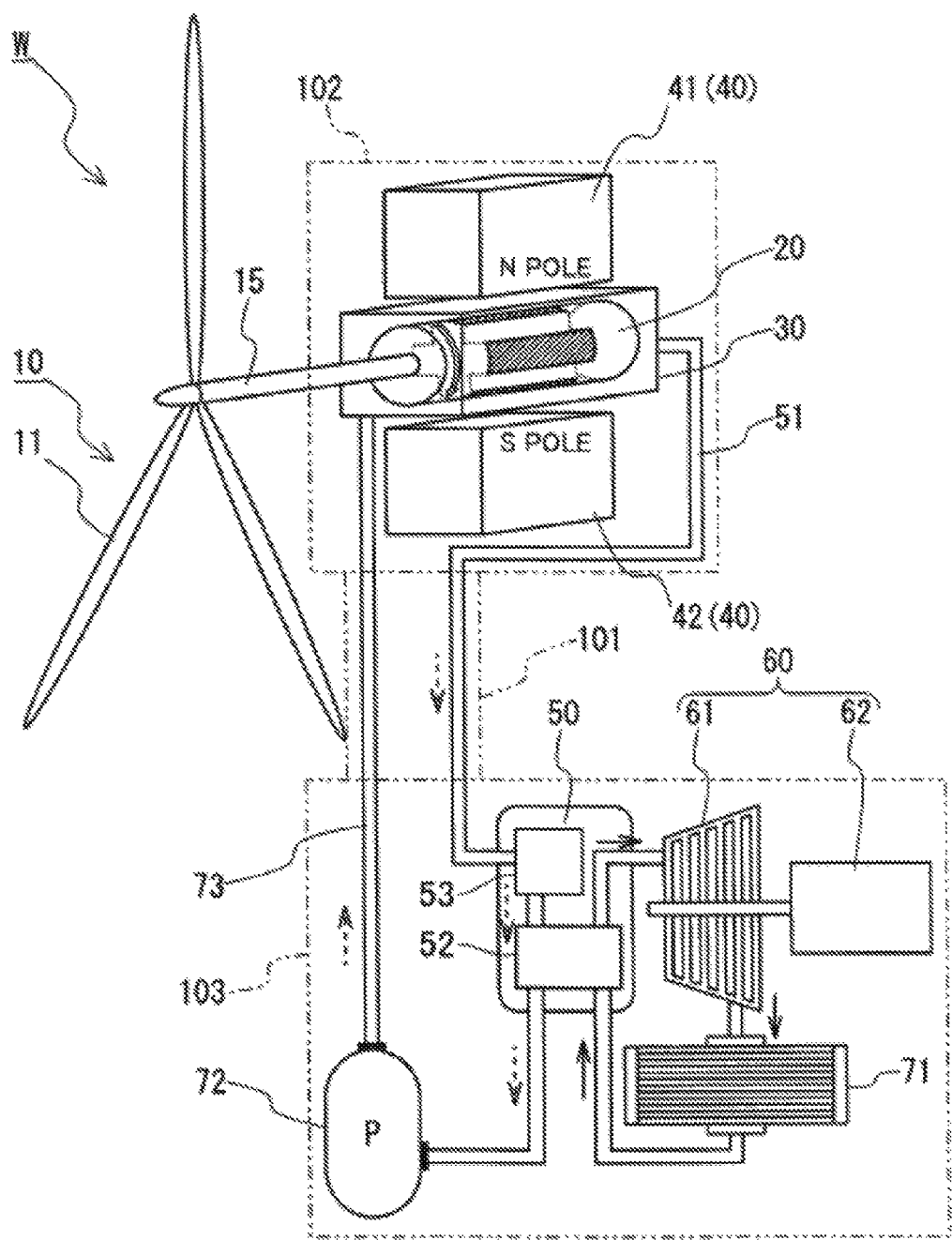
FIG. 1 is a schematic diagram for illustrating an example of a wind power generation system according to the present invention.

FIG. 1 shows an electric power generation system W including a wind turbine 10, a conductor 20, a heat transfer medium vessel 30, a magnetic field generator 40, a heat accumulator 50, and an electric power generation unit 60. Wind turbine 10 is attached to a nacelle 102 provided at an upper portion of a tower 101, and conductor 20, heat transfer medium vessel 30 and magnetic field generator 40 are housed in nacelle 102. Furthermore, heat accumulator 50 and electric power generation unit 60 are provided in a building 103 built at a lower portion (or a base) of tower 101. Electric power generation system W is configured, as will be described hereinafter more specifically.

Wind turbine 10 is structured with a horizontally extending rotary shaft 15 and three blades 11 attached to rotary shaft 15 radially. For a wind power generation system with an output exceeding 5 MW, it has a diameter of 120 m or larger and a rotational speed of approximately 10-20 rpm.

Conductor 20 is directly linked to rotary shaft 15, and rotates as wind turbine 10 does. Conductor 20 is formed of a material heated through induction as an eddy current is generated as the material rotates in a magnetic field. Conductor 20 can be formed for example of metal such as aluminum, copper, iron or the like. If conductor 20 is formed of aluminum, it can be reduced in weight. If conductor 20 is formed of iron or a similar magnetic substance, it allows increased magnetic flux density and hence an increased eddy current (or heating energy). Accordingly, the conductor may have a portion provided with a magnetic substance, and for example, a columnar (cylindrical) conductor (e.g., aluminum) may have a center provided with a magnetic substance (e.g., iron).

Furthermore, conductor 20 can be circularly columnar, circularly cylindrical, polygonally columnar, polygonally cylindrical, or similarly, variously shaped.

Heat transfer medium vessel 30 has conductor 20 incorporated therein, and has also a heat transfer medium accommodated therein to receive heat from conductor 20 heated. The heat transfer medium can be liquid such as water, oil, molten salt, for example. Herein, an example with a heat transfer medium of water will be described.

Magnetic field generator 40 has a structure having a pair of magnets 41 and 42 oppositely disposed with conductor 20 posed therebetween. Herein, magnets 41 and 42 are implemented as permanent magnet, and generate a direct current magnetic field allowing a magnetic flux to flow from magnet 41 to magnet 42 (see FIG. 3(A)). Magnetic field generator 40 may not be permanent magnet and may instead employ a normal conducting coil or a superconducting coil or the like excited to generate a magnetic field.

In electric power generation system W magnetic field generator 40 is operated to generate a magnetic field and therein conductor 20 is rotated and thus heated through induction, and the conductor's heat is transmitted to the water (or heat transfer medium) in heat transfer medium vessel 30 to cause high temperature and high-pressure steam. The generated steam is delivered to heat accumulator 50 through a transport pipe 51 that couples heat transfer medium vessel 30 and heat accumulator 50.

Heat accumulator 50 receives the steam through transport pipe 51 and accumulates its heat, and also supplies electric power generation unit 60 with steam required for generating electric power.

Electric power generation unit 60 has a structure formed of a combination of a steam turbine 61 and an electric power generator 62, and uses steam supplied from heat accumulator 50 to rotate steam turbine 61 and thus drives electric power generator 62 to generate electric power.

Heat accumulator 50 and electric power generation unit 60 can utilize solar thermal power generation technology. Heat accumulator 50 can for example be a steam accumulator accumulating steam in the form of water under pressure, or a heat accumulator of a sensible heat type using molten salt, oil, or the like or a heat accumulator of a latent heat type utilizing a change of phases of molten salt having a melting point. A heat accumulation system of the latent heat type accumulates heat in accordance with the phase change temperature of a heat storage material, and thus has a narrower heat storage temperature range and a larger heat storage density than that of the sensible heat type. Furthermore, heat accumulator 50 may be equipped with a heat exchanger 52 and a heat accumulating portion 53. The heat stored in heat accumulator 50 may be used to use the heat exchanger 52 to generate steam required for generating electric power. As shown in FIG. 1, a heat exchanger 52 and a heat accumulating portion are depicted in the heat accumulator 50. The system (W) is shown as having a first and second loop. The first loop circulates a heat transfer medium and is configured by a delivery pipe 51, a heat accumulator 50, and a water feed pipe 73. The second loop provides steam to a steam turbine 61, and is configured by the steam turbine 61, a condenser 71, and the heat exchanger 52.

The steam delivered to heat accumulator 50 stores heat in heat accumulator 50 or rotates turbine 61, and is thereafter cooled by a steam condenser 71 and thus condensed into water. Subsequently, the water is delivered to pump 72 to be high-pressured water which is in turn delivered through a water feed pipe 73 to heat transfer medium vessel 30 and thus circulates.

The present electric power generation system's specification will now be discussed. Herein, an electric power generation system providing an output exceeding 5 MW is assumed. Specifically, a trial calculation is done of a size of a conductor that is required to generate a thermal energy of 7.2 MW when the conductor is rotated at 15 rpm.

NPL 5 discloses that a direct current is passed through a superconducting coil to generate a magnetic field and therein an electrically conductive workpiece is rotated and thus heated through induction. This literature describes a specification of an induction heating apparatus heating a circularly columnar aluminum billet, as follows: input power: 360 kW, rotational speed: 240-600 rpm, and billet size: a diameter of 178 mm×a length of 690 mm.

Furthermore, the induction heating provides energy P represented by the following expression (see Electrical Engineering Handbook (published by the Institute of Electrical Engineers of Japan, date issued: Feb. 28, 1988 (first edition)), p. 1739):

$$P = 2.5 f H^2 L \mu_r A Q 10^{-8} \text{ (in the CGS system of units)} \quad (1)$$

In the expression, f represents frequency (1/s) and can be obtained from the conductor's rotational speed. H represents magnetic field strength (Oe) and is herein set constant. L represents the conductor's axial length (in cm), A represents the conductor's cross section (in cm$^2$), and L×A represents the conductor's volume. $\mu_r$ represents the conductor's relative permeability and Q represents a correction coefficient depending on the conductor's geometry. Herein, the value of Q is also fixed in order to render the conductor geometrically similar to the above circularly columnar billet. From expression (1) it can be seen that energy P (W) is proportional to frequency f and volume (length L×area A).

When the assumed electric power generation system is compared with the above induction heating apparatus, the electric power generation system has a rotational speeds of approximately 1/20 of that of the induction heating apparatus, and, on the other hand, generates thermal energy approximately 20 times the electric power input to the induction heating apparatus. Accordingly, the assumed electric power generation system would require a conductor of approximately 400 times in volume, as estimated.

As a result of trial calculation, if the conductor is a circularly columnar aluminum billet, it will for example have a size equivalent to 1,320 mm in diameter×5,110 mm in length, a volume of approximately 7 m$^3$, and a weight of approximately 21 tons (21,000 kg, converted with a density of 3 g/cm$^3$). Furthermore, together with the other equipment housed in the nacelle, it is expected that the nacelle will have a weight of approximately 50 tons. For a wind power generation system providing an output of 5 MW, a gearless type includes a nacelle having a weight exceeding 300 tons. It can be seen that the present electric power generation system can have an equivalent or larger ability and also reduce the nacelle's weight significantly.

First Exemplary Variation

The first embodiment has been described with reference to an example with a magnetic field generator of permanent magnet. Alternatively, a normal conducting coil or a superconducting coil may be used and, energized and thus excited to generate a magnetic field. An example of a magnetic field generator which utilizes the superconducting coil as a means for generating a magnetic field will be described with reference to FIG. 2.

Figure 2:
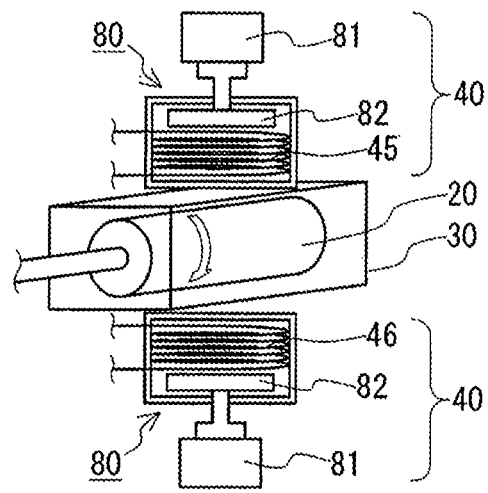
FIG. 2 is a schematic diagram for illustrating an example of a magnetic field generator having a superconducting coil.

With reference to FIG. 2, magnetic field generator 40 has superconducting coils 45 and 46, disposed oppositely with conductor 20 posed therebetween. Superconducting coil 45 (46) is accommodated in a cooling container 80, and is attached to a refrigerating machine 81 at a cold head 82 and thus cooled through conduction. A superconducting coil, in comparison with a normal conducting coil, allows a stronger magnetic field to be generated and can thus help to achieve small size and weight. Furthermore, when a superconducting coil is used, dispensing with an iron core can eliminate magnetic saturation, and as the iron core is absent, further lightweight can be achieved.

Furthermore, when a superconducting coil is used, a liquid coolant (liquid nitrogen for example) may be introduced into the cooling container, and the superconducting coil may be immersed in the liquid coolant, while the liquid coolant may be circulated and thus be cooled by the refrigerating machine. In that case, a circulation mechanism such as a pump which pumps the coolant may be disposed in the nacelle, or may be disposed in a building located at a lower portion of the tower.

Second Exemplary Variation

Figure 3:
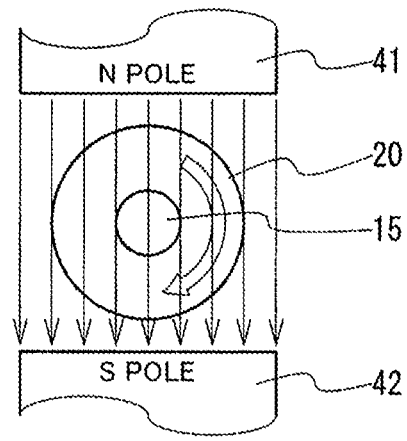
FIG. 3(A) is a figure for illustrating how a magnetic flux flows when two magnets are disposed oppositely with a conductor posed therebetween.
FIG. 3(B) is a figure for illustrating how a magnetic flux flows when four magnets are disposed along a conductor's circumferential direction uniformly with their magnetic poles arranged alternately.
Figure 3:
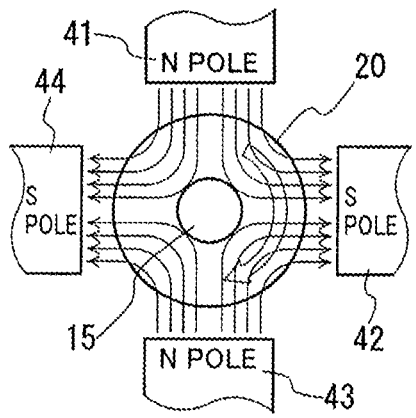

The first embodiment has been described with an example including a magnetic field generator having two magnets oppositely. Alternatively, three or more magnets may be disposed. For example, a plurality of magnets are disposed along a conductor's circumferential direction with their magnetic poles arranged alternately. For example, as shown in FIG. 3(B), if four magnets 41-44 are disposed, a magnetic field is generated to cause a magnetic flux to flow from magnets 41 and 43 to magnets 42 and 44.

Third Exemplary Variation

The first embodiment has been described with an example including a magnetic field generator generating a direct current magnetic field providing a magnetic field which does not vary with time. Alternatively, a plurality of coils may be used to generate a revolving magnetic field. For example, a plurality of coils may be disposed along a conductor's circumferential direction so that the plurality of coils are sequentially excited to generate a revolving magnetic field along the conductor's circumferential direction. More specifically, paired coils may be disposed along the conductor's circumferential direction radially oppositely, and three such pairs of coils may be disposed along the conductor's circumferential direction equidistantly. Note that setting the revolving magnetic field's direction opposite to that in which the conductor rotates can increase the conductor's apparent rotational speed and hence thermal energy generated. When the revolving magnetic field is generated, each coil pair may be excited by a current corresponding to a phase of a 3-phase alternating current, for example.

Fourth Exemplary Variation

The first embodiment has been described with an example using a heat transfer medium of water. Alternatively, a liquid metal having a thermal conductivity higher than water may be used as the heat transfer medium. Such a liquid metal is liquid sodium, for example. If the liquid metal is used as the heat transfer medium, then, for example, the liquid metal may be used as a primary heat transfer medium receiving heat from the conductor and the heat of the liquid metal delivered through a transport pipe may be used to heat a secondary heat transfer medium (or water) via a heat exchanger to generate steam.

Note that the present invention is not limited to the above embodiments and can appropriately be modified within a range which does not depart from the gist of the present invention. For example, the conductor, the heat transfer medium and the like may be modified as appropriate, and the magnetic field generator may be implemented with a normal conducting coil.

INDUSTRIAL APPLICABILITY

The present electric power generation system is suitably applicable in the field of electric power generation utilizing wind power.

REFERENCE SIGNS LIST

W: wind power generation system;
10: wind turbine;
11: blade;
15: rotary shaft;
20: conductor;
30: heat transfer medium vessel;
40: magnetic field generator;
41, 42, 43, 44: magnet;
45, 46: superconducting coil;
50: heat accumulator;
51: transport pipe;
60: electric power generation unit;
61: steam turbine;
62: electric power generator;
71: steam condenser;
72: pump;
73: water feed pipe;
80: cooling container;
81: refrigerating machine;
82: cold head;
101: tower;
102: nacelle;
103: building.

The invention claimed is:

1. An electric power generation system comprising:
   a wind turbine;
   a conductor rotating as said wind turbine rotates;
   a magnetic field generator generating a magnetic field traversing said conductor,
said magnetic field generator including first and second magnetic poles facing a surface of said conductor, said first and second magnetic poles being arranged along a rotational direction of said conductor, said first magnetic pole having a first magnetic polarity, and said second magnetic pole having a second magnetic polarity different from said first magnetic polarity;
   a heat transfer medium receiving heat from said conductor rotated in said magnetic field and thus heated through induction;
   a heat accumulator accumulating heat of said heat transfer medium;
   a heat exchanger exchanging heat converting water into steam by using the accumulated heat;

an electric power generation unit generating electrical energy by using said steam supplied by said heat exchanger;

a heat transfer medium vessel having accommodated therein said heat transfer medium receiving heat from said conductor;

a first loop circulating said heat transfer medium between said vessel and said heat exchanger; and a second loop circulating said water between said electric power generation unit and said heat exchanger.

2. The electric power generation system according to claim 1, wherein said electric power generation system comprises:

a tower extending higher than a position of said electric power generation unit; and a nacelle provided at an upper portion of said tower and provided with said wind turbine, said conductor and said magnetic field generator;

wherein said heat transfer medium vessel is disposed in said nacelle and said first loop includes a transport pipe delivering said heat transfer medium from said heat transfer medium vessel to said heat accumulator.

3. The electric power generation system according to claim 1, wherein said electric power generation unit has a turbine rotated by the steam supplied by said heat accumulator, and an electric power generator driven by said turbine.

4. The electric power generation system according to claim 1, wherein said conductor has a portion provided with a magnetic substance.

5. The electric power generation system according to claim 1, wherein said magnetic field generator has a coil generating a magnetic field.

6. The electric power generation system according to claim 5, wherein said coil is a superconducting coil.

7. The electric power generation system according to claim 1, wherein said electric power generation unit generates the electrical energy of at least 5 MW.

8. The electric power generation system according to claim 1, wherein said first and second magnetic poles are arranged on opposite sides across said conductor.

9. The electric power generation system according to claim 1, wherein at least three magnetic poles including said first and second magnetic poles are arranged along the rotational direction of said conductor such that said first magnetic polarity and said second magnetic polarity are alternately arranged along the rotational direction of said conductor.

10. The electric power generation system according to claim 5, wherein the coil is wound around a direction crossing a rotation axis of said conductor.

11. The electric power generation system according to claim 1, wherein said heat exchanger is included in said heat accumulator.

* * * * *